US012748894B2

(12) United States Patent
Shi et al.

(10) Patent No.: US 12,748,894 B2
(45) Date of Patent: Sep. 29, 2026

(54) VERIFYING MACHINE LEARNING MODEL INTEGRITY BY HASHING

(71) Applicant: Love DAO, El Cerrito, CA (US)

(72) Inventors: Wei Shi, El Cerrito, CA (US); Terry Roston, Erie, MI (US); Eli White, Casa Grande, AZ (US)

(73) Assignee: Love DAO, El Cerrito, CA (US)

(*) Notice: Subject to any disclaimer, the term of this patent is extended or adjusted under 35 U.S.C. 154(b) by 135 days.

(21) Appl. No.: 18/811,549

(22) Filed: Aug. 21, 2024

(65) Prior Publication Data

US 2025/0068773 A1 Feb. 27, 2025

Related U.S. Application Data

(60) Provisional application No. 63/578,128, filed on Aug. 22, 2023.

(51) Int. Cl.
*G06F 21/64* (2013.01)
*H04L 9/06* (2006.01)

(52) U.S. Cl.
CPC ............ *G06F 21/64* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 9,635,012 | B2 * | 4/2017 | Camenisch | H04L 9/30 |
| 11,249,982 | B2 * | 2/2022 | Tormasov | H04L 9/3239 |
| 11,303,454 | B2 * | 4/2022 | Herrin | H04L 9/3239 |
| 11,481,680 | B2 * | 10/2022 | Dayama | G06N 20/00 |
| 11,494,171 | B1 * | 11/2022 | Acharya | H04L 9/0861 |
| 11,568,062 | B2 * | 1/2023 | Guo | G06N 3/02 |
| 11,582,260 | B2 * | 2/2023 | Cheng | H04L 9/0643 |
| 2020/0250312 | A1 * | 8/2020 | Kumar Addepalli | G06F 21/55 |
| 2024/0070306 | A1 * | 2/2024 | Jurat | G06F 21/6218 |
| 2024/0305465 | A1 * | 9/2024 | Vahldiek-Oberwagner | H04L 9/3236 |
| 2025/0068773 | A1 * | 2/2025 | Shi | H04L 9/3239 |
| 2025/0190784 | A1 * | 6/2025 | Dialani | H04L 9/3218 |
| 2025/0343697 | A1 * | 11/2025 | Chen | H04L 9/3236 |

* cited by examiner

*Primary Examiner* — Backhean Tiv
(74) *Attorney, Agent, or Firm* — KNOBBE, MARTENS, OLSON & BEAR, LLP

(57) ABSTRACT

A system may include a plurality of subsystems, such as an identity management system configured to store information associated with digital identities, a resource management system configured to store information associated with resources of a community, a financial system configured to manage financial transactions, an infrastructure system configured to manage a digital representation of the community, a transportation system configured to manage a plurality of transportation devices of the community, an education system configured to manage the education of the community, a security system configured to secure information of the plurality of subsystems, an energy system configured to manage an electrical transmission system and an electrical generation system of the community, and a central hub system configured to manage other subsystems.

20 Claims, 10 Drawing Sheets

VERIFYING MACHINE LEARNING MODEL INTEGRITY BY HASHING

CROSS-REFERENCE TO RELATED APPLICATIONS

This application claims benefit of U.S. Provisional Patent Application No. 63/578,128, filed Aug. 22, 2023, entitled "SUSTAINABILITY ENGAGEMENT." The entire disclosure of which is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

BACKGROUND

Computing systems can receive data from disparate systems, and use received data to make decisions for connected systems. In some cases, computing systems may request a user perform an action to implement a decision. In some implementations, computing systems maintain log files in an accessible manner to record recommended and completed actions for later review.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
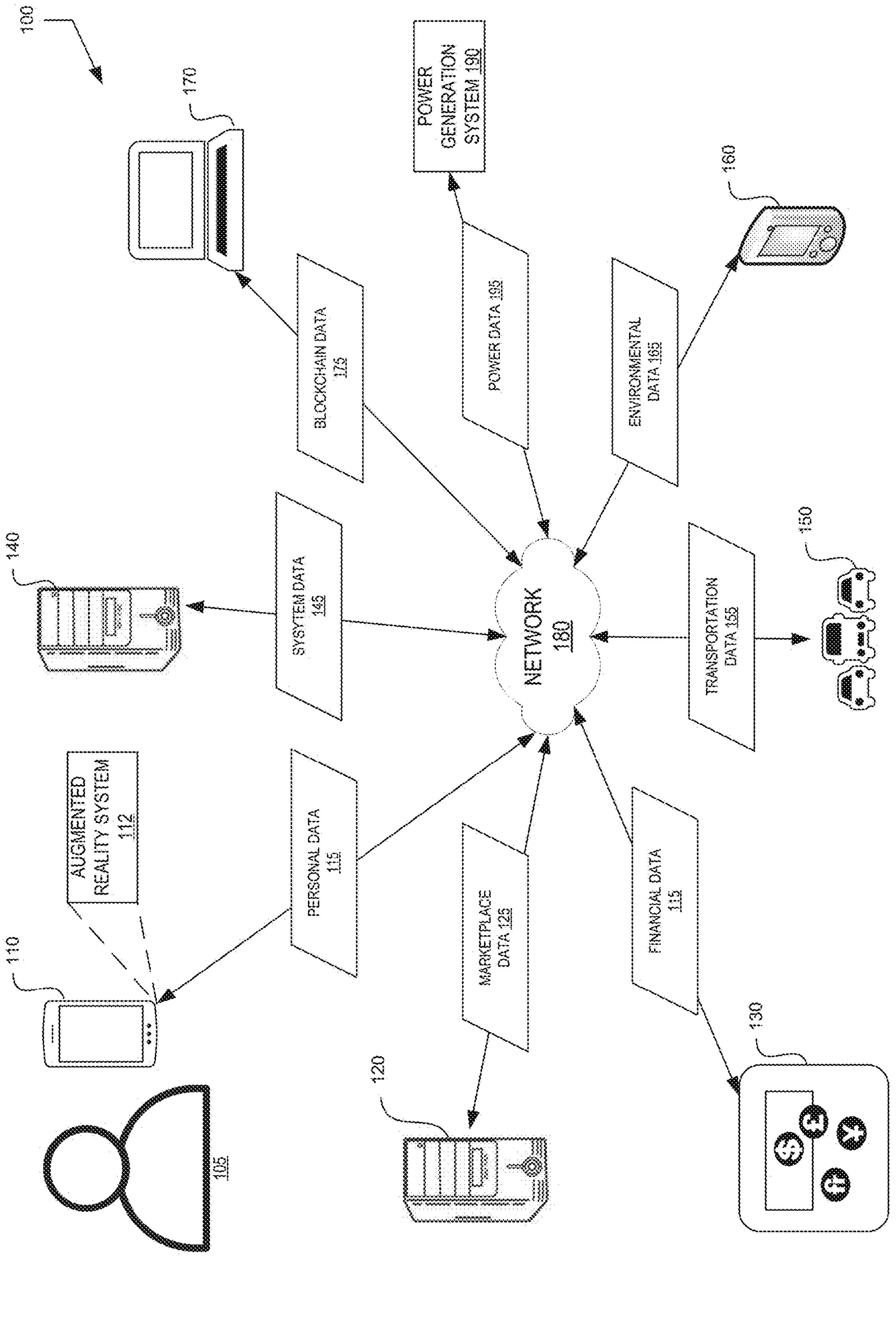
FIG. 1 is a diagram of illustrative data flows within a system for sustainability engagement.

The present disclosure relates to a scalable, secure, and sustainable solution for data management using a decentralized data management system, focusing on providing sustainable solutions, for example in a smart city.

Many existing solutions do not prioritize sustainability. They may not provide mechanisms for optimizing resource usage, reducing waste, and promoting sustainable practices. Traditional resource management systems often rely on manual processes and outdated technologies. This results in inefficiencies, inaccuracies, and delays in resource allocation and usage tracking. Moreover, these systems lack real-time data collection and analysis capabilities, limiting their ability to predict and respond to changing resource needs promptly and effectively.

Conventional governance structures typically involve a small group of individuals making decisions for the entire community. This limits the ability of community members to contribute to decision-making processes and does not always reflect the diverse needs and interests of the community. Further, Urban planning and infrastructure development often involve complex processes and require collaboration between various stakeholders. Traditional methods may lack the necessary tools and platforms to facilitate this collaboration efficiently and transparently. Additionally, existing systems may not provide sufficient privacy and security measures to protect user data and transactions. This can lead to breaches of trust and potential legal issues.

Existing systems for managing digital identities and assets often lack the necessary security features to protect user data and transactions. Moreover, they may not provide the necessary flexibility and adaptability to cater to the evolving needs of users. Additionally, Many existing systems are not designed to scale effectively as the community grows. They may also lack interoperability with other systems, limiting their functionality and adaptability.

As cities and communities continue to grow and evolve, the need for a comprehensive, scalable, and efficient solution to manage them becomes increasingly apparent. As communities grow, the systems managing them must be able to scale accordingly. Traditional governance and management systems often struggle to handle the increasing complexity and volume of data. A scalable solution, such as blockchain and AI-based systems, can handle large amounts of data and complex processes, ensuring efficiency as the community grows.

Today's urban environments require a holistic approach to decision-making, considering various aspects like transportation, resource allocation, infrastructure development, and more. An integrated system that facilitates collective decision-making and incorporates diverse inputs can lead to more informed and beneficial decisions. Further, with the rise of digital transactions and interactions, managing digital identities and assets securely and efficiently has become a necessity. Blockchain-based systems can provide a secure and transparent platform for these operations, enhancing trust and convenience for users.

In some embodiments, SustainVect introduces a blend of technologies including blockchain, machine learning systems, and Internet of Things (IoT) devices to create a comprehensive and integrated solution for resource management. This integration differs in key ways from current smart city solutions. By integrating machine learning algorithms and AI, SustainVect is capable of predicting and optimizing resource usage patterns, which is a novel application of these technologies in the context of smart cities. SustainVect's intelligent resource management system allows smart cities to optimize the allocation of resources, reducing waste and enhancing sustainability. The system includes mechanisms for managing and optimizing the use of renewable energy sources like solar, wind, and hydroelectric power. This helps in the promotion of sustainability and efficient resource usage. For example, SustainVect incorporates smart waste management and recycling systems. These systems work to promote sustainability and efficient use of resources.

In some embodiments, SustainVect is to facilitate the efficient management of resources in both centralized and decentralized settings. This includes the management of physical resources such as energy, water, and waste, as well as digital assets and resources. The system collects real-time data through IoT devices and uses AI and machine learning algorithms to optimize resource consumption, reduce waste, and promote sustainability. This leads to significant cost savings, improved environmental outcomes, and increased resilience in the face of resource scarcity or disruptions.

In some embodiments, SustainVect is integrated with IoT devices and sensors that provide real-time data on resource usage and environmental factors. The integration of these technologies helps promote sustainability in both centralized and decentralized environments. The system can, in some embodiments, be integrated with various financial systems, including both centralized and decentralized financial platforms. This integration allows for seamless transactions and value exchange within the community. Further, the technology behind SustainVect facilitates collaborative and efficient urban planning and infrastructure development. This is achieved through the creation of digital twins of urban environments, allowing for better planning and resource allocation. Additionally, SustainVect can be integrated with various transportation and mobility systems. This includes autonomous vehicles, public transit systems, ride-sharing platforms, and more. This integration provides efficient and sustainable mobility solutions for the community.

Referring to blockchain integration, the system may integrate with the OptiChain algorithm, an advanced optimization method designed to enhance the performance, efficiency, and sustainability of various aspects of the SustainVect ecosystem, from resource management to decision-making processes. The system may expand its capabilities by integrating with blockchain platforms, such as Hyperledger Fabric, and implementing chaincode, like the SimpleKVContract. This integration improves data integrity, access control, and scalability, further enhancing the overall functionality and security of the platform.

Additionally, the system may integrate with health monitoring systems, telemedicine, and well-being applications. This integration works to improve the overall quality of life for community members. SustainVect may further include systems for monitoring and responding to natural disasters and emergencies. This increases the resilience of communities and cities using the technology. SustainVect may implement swarm intelligence and collective decision-making algorithms. This allows the community to make more informed decisions as a collective, improving the overall efficiency and effectiveness of the system.

In additional embodiments, the system supports education and skill development platforms. This feature allows community members to access and share knowledge, work on collaborative projects, and develop new skills. SustainVect is further designed to integrate with emerging technologies such as 5G, edge computing, and quantum computing, making it a versatile solution that can leverage the latest technological advancements.

The system further may promote sustainability by optimizing resource consumption, reducing waste, and encouraging responsible behavior through incentive systems. By integrating with renewable energy sources, smart waste management systems, and other environmentally friendly technologies, SustainVect actively contributes to the sustainability of the communities it serves. Through its user-friendly interface and gamification elements, SustainVect encourages community members to actively participate in decision-making processes and community activities. This increases engagement and fosters a sense of ownership and belonging among community members.

Additional aspects of the present disclosure relate to a decentralized data management system implemented using a blockchain system for secure data storage and an efficient data filtering and retrieval mechanism.

Further embodiments of the present disclosure relate to decentralized governance through a voting system.

In some embodiments, the decentralized governance model is provided by SustainVect, allowing for democratic decision-making processes and enhancing community involvement and accountability. SustainVect may further provide a secure, decentralized method for creating and managing digital identities and assets. This feature allows individuals to have ownership and control over their digital identities and assets, which is a new concept in the field. The use of blockchain technology and smart contracts in SustainVect ensures data integrity and security, making it a useful tool for managing digital identities and assets. The decentralized governance model supported by SustainVect promotes transparency and encourages citizen participation. SustainVect prioritizes privacy and security through the use of end-to-end encryption, secure data storage options, and secure communication protocols. These features ensure the safety of users' data within the ecosystem.

In some embodiments, the system provides comprehensive governance mechanisms. These mechanisms allow for increased community involvement in decision-making processes. This involvement can range from voting on policies, determining resource allocation, to infrastructure development in both centralized and decentralized settings. SustainVect's robust technology offers the creation, management, and exchange of digital identities and assets. This can be facilitated using various forms of technology such as RFID, NFC, QR codes, and blockchain technology. These aspects are essential for any digital community and contribute to the security and functionality of the entire system.

Further embodiments of the present disclosure relate to a Love scoring system for encouraging sustainable activities in a user of the system.

Various aspects of the disclosure will be described with regard to certain examples and embodiments, which are intended to illustrate but not limit the disclosure. Although aspects of some embodiments described in the disclosure will focus, for the purpose of illustration, on particular examples of blockchain implementations, distributed or centralized systems, and the like, the examples are illustrative only and are not intended to be limiting. In some embodiments, the techniques described herein may be applied to additional or alternative types of blockchain implementations, distributed or centralized systems, and the like. Additionally, any feature used in any embodiment described herein may be used in any combination with any other feature or in any other embodiment, without limitation.

The term "machine learning model," as used in the present disclosure, can include any computer-based models of any type and of any level of complexity, such as any type of sequential, functional, or concurrent model. Models can further include various types of computational models, such as, for example, artificial neural networks ("NN"), language models (e.g., large language models ("LLMs")), artificial intelligence ("AI") models, machine learning ("ML") models, multimodal models (e.g., models or combinations of models that can accept inputs of multiple modalities, such as images and text), generative adversarial networks ("GANs"), transformer-based models, and the like. A "non-deterministic model" as used in the present disclosure, is any model in which the output of the model is not determined solely based on an input to the model. Examples of nondeterministic models include language models such as LLMs, ML models, and the like.

Example Sustainability Engagement System

With reference to an illustrative example, FIG. 1 shows a user 105 and a system 100 comprising a computing device 110, a marketplace system 120, a financial system 130, a governance system 140, a transportation system 150, an environmental analysis device 160, a blockchain system 170, a network 180, and a power generation system 190.

In some embodiments, the computing device 110 may be associated with a user, for example user 105. The computing device 110 may be a smartphone, laptop computing device, desktop computer, or any computing device configured to present information of the system 100 to the user 105 and receive input from the user 105. In some embodiments, the computing device 110 comprises an augmented reality system 112. The augmented reality system 112 may be configured to produce visual, audio, or other elements associated with an augmented reality presentation directed to the user 105. The computing device 110 may be further configured to collect personal data 115 from the user 105. Personal data 115 may include, for example, information associated with an action taken by the user 105 in response to a prompt from the augmented reality system 112, an example of which will be presented in further detail in relation to FIG. 3. Personal data 115 may also include information about an action taken by the user 105 which may, for example, be used to update a user score, currency holding, or other system information associated with the user 105 and stored or updated by a component of the system 100 (e.g., a current value of a user's currency wallet, a use of a transportation service, an action affecting the environment of the system, etc.). As a further example, personal data 115 may include a unique digital identity that ensures secure and efficient interactions. The digital identities are created using a combination of technologies including RFID, NFC, QR codes, and holographic vectors.

In some embodiments, the marketplace system 120 is a computing device configured to manage a marketplace associated with the system 100. In some embodiments, managing a marketplace may comprise storing information associated with items offered for sale within the marketplace (e.g., identifying information, price information, a time for listing an item for sale, a seller identity, etc.), information associated with users of the marketplace, and any other information used to facilitate the sale and purchase of items on the marketplace. Additionally, the marketplace system 120 may facilitate an auction system comprising one or more of: setting or receiving a minimum bid value, a buyout value, a current bid value, bid information associated with an item for auction, user information associated with a bid, etc. The marketplace system 120 may transmit marketplace data 125 to other components of the system 100, for example via the network 180.

In some embodiments, the financial system 130 is a system for managing the use of one or more currencies for the system 100. For example, the financial system 130 may determine a conversion value between a currency of the system (e.g., a digital currency) and a currency used outside the system (e.g., U.S. dollars). In another example, the financial system 130 may determine a conversion between a user score value and a currency of the system, or an amount of the currency of the system to distribute to one or more users based on their system score. In another example, the financial system may analyze the current amount of currency, volume of sales, volume of purchases, volume of bids, etc. to determine or update currency values. The financial system 130 may generate and/or receive financial data 115 associated with the system 100 from one or more components of the system 100. Further, the financial system 130 may handle a wide variety of assets, including physical assets (like real estate or vehicles), digital assets (like NFTs or tokens), and services (like shared rides or power from a solar grid). The financial system 130 may further enable seamless transactions and value exchanges within the community. The financial system 130 may integrate with both traditional financial systems and DeFi platforms, allowing users to easily manage their finances and participate in the community's economy.

In some embodiments, the governance system 140 may be a system configured to manage, facilitate, and/or perform various functions associated with governance of the system 100. Some or all of the governance functions of the governance system 140 may be performed by one or more machine learning models. The detailed functions of the governance system 140 will be discussed in further detail with respect to FIGS. 2A-2B and 6-7.

In some embodiments, the transportation system 150 is a system for managing transportation equipment associated with the system 100. For example, the transportation system 150 may store information associated with each transport equipment of the system 100. Transport equipment may include cars, busses, bicycles, forklifts, trucks, trains, quadcopters, drones, or any other vehicle designed to transport people, goods, or any other object to locations. Additionally, the transportation system 150 may manage scheduling, procuring, managing repairs of, or other functions associated with operating and directing transport equipment. The transportation system 150 of this embodiment transmits transportation data 155 to the system 100. The transportation may comprise, for example, scheduling information associated with transport equipment, utilization data for transport equipment, a current repair state of transport equipment, etc. The transportation system 150 may, in some embodiments, manage autonomous vehicles, public transit systems, ride-sharing platforms, and micro-mobility services.

In some embodiments, the environmental analysis device 160 is a computing device configured to collect and/or analyze data associated with the environment in which the system 100 operates. For example, the environmental analysis device 160 may be a wireless sensor (e.g., an internet of things device) configured to measure an aspect of the local environment (e.g., a temperature, humidity, motion, presence or absence of a person, an environmental hazard, etc.). In another example, the environmental analysis device 160 may be a computing device in communication with a sensor, the computing device configured to process information received from the sensor and transmit the information as environmental data 165 to the system 100. The transportation system environmental analysis device 160 may additionally support various health monitoring systems, telemedicine platforms, and well-being applications, thereby supporting the overall health and well-being of the community members. In further embodiments, the environmental analysis device 160 may manage systems for monitoring and responding to natural disasters and emergencies, increasing resilience of the community in which the system 100 operates. Additionally, the environmental analysis device 160 may manage smart waste collection and recycling systems. It optimizes waste collection routes, manages recycling processes, and promotes waste reduction and recycling practices within the community.

In some embodiments, the blockchain system 170 may be a computing device configured to manage or participate in one or more blockchain-based transaction systems (e.g., Litecoin, Bitcoin, Ethereum, etc.). In some embodiments, the blockchain system 170 may be configured to operate as part of a system implementing OptiaChain, a blockchain-based technology configured to allow for decentralized data storage. In some embodiments, the blockchain-based transaction system of the blockchain system 170 may be a component of the SustainVect system, providing secure and traceable transaction information and data storage as part of a blockchain-based, AI-drive system for sustainable resource management, digital identity, and decentralized governance. The blockchain system 170 may provide blockchain data 175 to the system 100, and receive information associated with transactions on the one or more blockchains managed by the blockchain system 170. In some embodiments, the blockchain system 170 may be a plurality of computing devices in communication over the network 180 and exchanging blockchain data 175 to implement a decentralized blockchain implementation.

In some embodiments, the power generation system 190 is a system configured to generate and manage the distribution of electrical power within the environment of the system 100 in a responsible and sustainable manner. For example, the power generation system 190 may comprise solar panels, wind turbines, etc. The power generation system 190 may further comprise various electrical storage systems, for example batteries, flywheels, capacitors, electrical power stored as gravitational potential (e.g., by pumping water to an elevated point when there is an excess of electricity being generated and allowing gravity to push the water past a turbine when electricity is needed by the system 100), electrical power stored as heat (e.g., in molten salt), etc. The power generation system 190 may receive power data 195 from the system 100, for example the power requirements of various systems of the system 100, and may use the received power data 195 to optimize electrical generation and storage. Further, the power generation system 190 may transmit power data 195 to the system.

In some embodiments, the network 180 allows for the transmission of data between some or all of the components of the system 100. The network 180 may be, for example, a local area network, a packet-switched data network, the Internet, a cellular network, etc. In some embodiments, the network 180 facilitates the management of data transmission between components by maintaining timing information used by the marketplace system 120, the financial system 130, and/or the blockchain system 170 to avoid timing-based disputes for facilitated transactions. The network 180 may provide a centralized timing resource to any component of the system 100 where consistent timing may be useful.

Figure 2A:
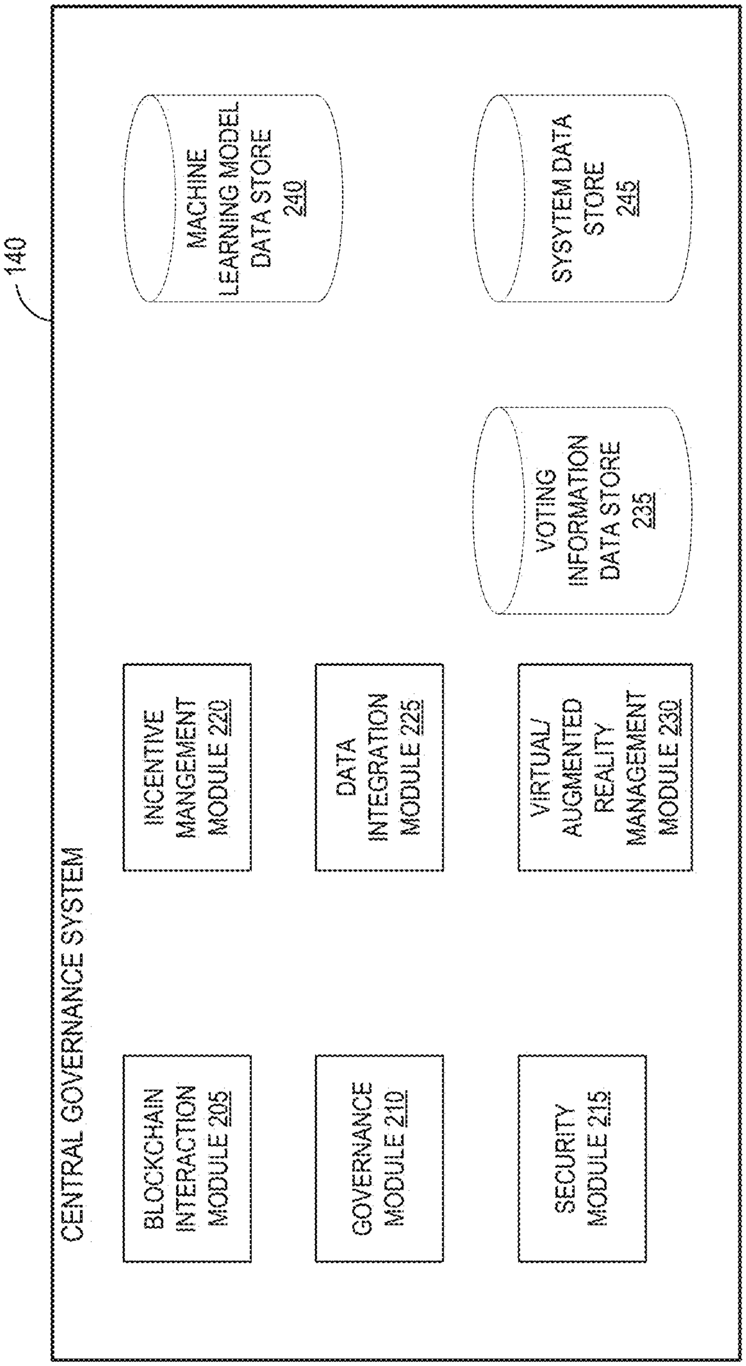
FIG. 2A is an illustrative block diagram of a central governance system according to some embodiments.

FIG. 2A illustrates a block diagram of an example governance system 140 configured to manage the governance of the system 100. The governance system 140 of this embodiment comprises a blockchain interaction module 205, a governance module 210, a security module 215, an incentive management module 220, a data integration module 225, a virtual/augmented reality management module 230, a voting information data store 235, a machine learning model data store 240, and a system data store 245.

Governance functions include facilitating voting (e.g., via a blockchain-based system), managing governance proposals (e.g., proposals for changes to governance received from a user 105 of the system 100), etc. In some embodiments of the system 100, various governance functions may be performed by different computing devices which may be in communication via the network 180 in order to implement a decentralized governance structure. In some embodiments, the governance system 140 manages centralized aspects of a governance structure, and act as a storage location for historical information associated with decentralized aspects of a governance structure.

In some embodiments, the blockchain interaction module 205 manages the interactions between the governance system 140 and blockchain-managed elements of the system 100, for example the blockchain system 170. The blockchain interaction module 205, in some embodiments, receives blockchain data 175 via the network 180 and processes the blockchain data 175 for use by the governance system 140. For example, the blockchain interaction module 205 may determine that conditions to execute a smart contract stored on a blockchain of the blockchain system 170 have been met and may then update information associated with a user 105, such as personal data 115, to indicate the outcome of the execution of the smart contract.

In some embodiments, the governance module 210 manages various governance elements of the system 100. For example, when a new proposal is made by a user 105, the governance module 210 may manage a determination of whether the proposal has reached a threshold required to initiate a vote, voting by the users of the system 100 on the proposal, determining a method of implementation of the proposal if the proposal is approved by the users, and/or instructing elements of the system 100 to implement the proposal. Various functions of the governance module 210 may be implemented by the use of a chaincode. In some embodiments, the governance module 210 is configured to provide transparency to users of the system 100 into how the system 100 is governed, for example by providing access to the chaincode used by the governance module 210 to allow for independent verification of the result of a vote. Further, the governance module 210 may be configured to determine when the correction of an issue requires a vote by users of the system 100, and may initiate such a vote independently. Initiating a vote may, in some examples, require determining a voting model, or threshold, for approval. Voting models may include simple majority, supermajority, and quadratic voting. The threshold may be a percentage or number of users who actually vote on the proposal, a percentage or number of total users of the system, or any other measure of users required to determine whether a proposal has been approved.

In some embodiments, the security module 215 manages the security of the system 100. For example, the security module 215 may be configured to monitor and analyze the flow of data over the network 180 to determine a potential security issue (e.g., a cyberattack) directed at the system 100. The security module 215 may additionally be configured to determine when a problem internal to the system 100 creates a security issue, and may automatically perform security validation of the system 100 to find such problems. For example, to determine whether there exists a risk of a SQL injection-type cyber-attack on the system 100, the security module 215 may automatically attempt to perform such an attack on each element of the system 100 (e.g., by attempting to inject a SQL command into the transportation data 155 transmitted to the transportation system 150). While a SQL injection attach is described in this example, it should be recognized that the security module 215 may be configured to recognize, or test for vulnerability to, any type of cyber attach. Additionally, the security module 215 may perform sanity checks on data transmitted to or from the governance system 140 to ensure that a user 105 is not attempting to provide false data to the system 100. Further, the security module 215 may perform functions required to ensure that identity information associated with users is secure, for example maintaining a store (e.g., in the system data store 245) of encrypted identity information. The security module 215 may also perform encryption and decryption functions for other elements of the governance system 140, and the system 100. For example, the security module 215 may validate requests for information from one element of the system (e.g., the transportation system 150) sent to another element of the system (e.g., the blockchain system 170) to ensure that the request is genuine.

In some embodiments, the incentive management module 220 is configured to determine incentives used to encourage users of the system 100 to engage in sustainable practices. For example, the incentive management module 220 may determine an appropriate reward for completing a gamified sustainable activity, described in more detail below in relation to FIG. 3. In some examples, the incentive management module 220 may assign a first incentive to completion of a task, and an associated timeframe in which the task is expected to be completed. If, in this example, the task is not completed within the timeframe, then the incentive management module 220 may increase the incentive value until the task is completed. Determination of an incentive may be based on, for example, personal data 115, environmental data 165, personal data 115, marketplace data 125, blockchain data 175, transportation data 155, power data 195, or any other information accessible to the governance system 140.

In some embodiments, the data integration module 225 analyzes system data 145 received from various elements of the system 100 to generate associations between related data, redirect data to an endpoint (e.g., directing voting information to the voting information data store 235), and/or perform analysis on received system data 145. The system data 145 may comprise any data generated by an element of the system 100 (e.g., marketplace data 125, system data 145, etc.). The data integration module 225 may additionally support the development of digital twins of urban environments and infrastructure, thereby facilitating efficient and collaborative urban planning and development.

In some embodiments, the augmented reality management module 230 performs functions associated with augmented reality information presented to a user 105. For example, when the governance module 210 or incentive management module 220 determines an action by a user 105 is needed to correct a system problem, the augmented reality management module 230 will generate the images presented by, for example a computing device 110, to the user 105 instructing the user 105 in the completion of the action. The augmented reality information generated by the augmented reality management module 230 may be based on, for example, the type of computing device 110 associated with the user 105 being instructed to complete the action, the location of the user 105, the type of action required, a timeframe for completing the action, or any other information available to the governance system 140. Augmented reality displays are discussed in further detail below in relation to FIG. 3.

In some embodiments, the voting information data store 235 stores data associated with the users of the system 100 used when generating a voting instance (e.g., a vote for implementing a proposal generated by the governance module 210), determining whether a voting threshold has been reached, a number of votes or voting weight associated with a user 105, etc. For example, as described previously herein, a vote from a user 105 may be given a weight determined at least in part by actions taken by the user 105 and recorded on by the blockchain system 170. for example as a currency value in the financial system 130 associated with the user 105.

In some embodiments, the machine learning model data store 240 stores machine learning models used by the governance system 140 to perform various governance functions. Additionally, the machine learning model data store 240 may store a machine learning model configured to be trained by the governance system 140 to further automate governance of the system 100. Examples of machine learning models stored by the machine learning model data store 240 include: adaptive learning models configured to personalize the experience of users of the system 100; models configured to generate a proposal for voting based on data received by the governance system 140; models configured to identify users based on their voice and/or a “fingerprint” based on the user’s activity; etc.

In some embodiments, the system data store 245 stores system data 145 received by the governance system 140 from the various components of the system 100, and may provide such system data 145 for further processing by elements of the governance system 140. As described previously herein, system data 145 may comprise any data associated with the system 100, such as marketplace data 125, blockchain data 175, power data 195, etc.

Each data store described herein (e.g., the machine learning model data store 240, the system data store 245, etc.) may be any combination of physical information storage mediums. For example, a data store may be a combination of any number of hard disk drives (“HDDs”), solid state drives (“SSDs”), compact disks (“CDs”), digital versatile disk (“DVD”), tape storage, and the like.

Figure 2B:
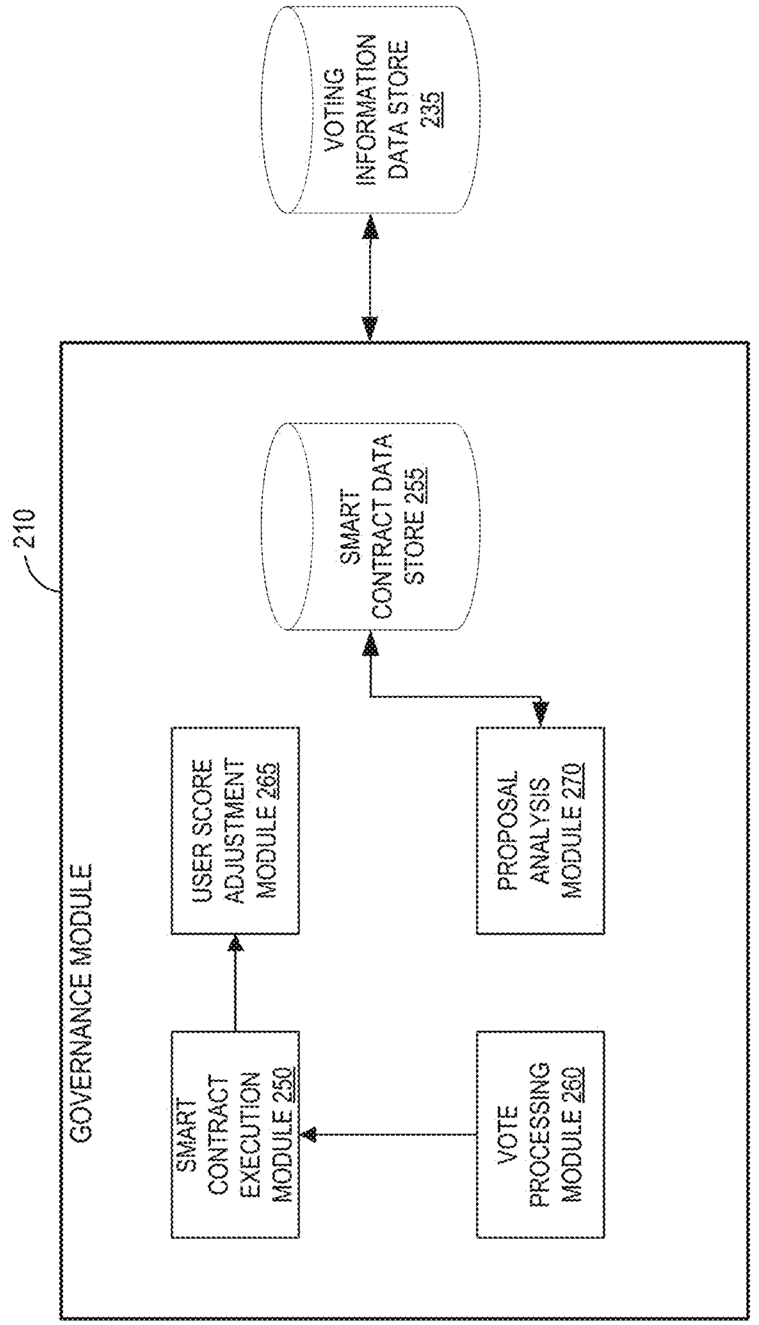
FIG. 2B is a block diagram of illustrative data flows within a governance module according to some embodiments.

FIG. 2B illustrates an example embodiment of a governance module 210, for example the governance module 210 of the governance system 140 of FIG. 2A. The governance module 210 of this embodiment comprises a smart contract execution module 250, a vote processing module 260, a user score adjustment module 265, a proposal analysis module 270, and a smart contract data store 255. The governance module 210 of this embodiment is in communication with a voting information data store 235, for example the voting information data store 235 of the governance system 140.

In some embodiments, the smart contract execution module 250 runs a program implemented as a smart contract on a blockchain of the blockchain system 170. For example, when a proposal is implemented as a smart contract on the blockchain system 170 and a vote has been completed where the result is approval of the proposal, the smart contract execution module 250 may execute the instructions contained in the smart contract to implement the proposal.

Instructions to execute the smart contract may be received from the vote processing module 260, which as described below determines whether a vote approves the proposal contained in the smart contract. Additionally, the result of executing a smart contract by the smart contract execution module 250 may require the adjustment of a score or other value associated with a user, and such information necessary to update the user's score or other value may be provided to the user score adjustment module 265.

In some embodiments, the smart contract data store 255 stores the instructions necessary to execute a smart contract. For example, when the smart contract is generated based on a proposal to increase the frequency of a bus route managed by the transportation data 155, the smart contract data store 255 may store the instructions necessary to increase the frequency of the bus route if the proposal is accepted after a vote. These instructions may be in a natural language form, binary form, compiled code form, or any other form the transportation data 155 (in this example) is configured to process. In some embodiments, the smart contract data store 255 may be in further communication with the smart contract execution module 250, and may provide instructions to the smart contract execution module 250.

In some embodiments, the vote processing module 260 receives voting information associated with a proposal, and processes the voting information to determine an outcome of the vote. For example, the vote processing module 260 may receive voting weights for users from the voting information data store 235, and adjust a vote tally based on the voting weights. Additionally, the vote processing module 260 may determine the voting model to be used when determining whether a proposal has been accepted. The determination of a voting model may be made based on, for example, a type of proposal, an impact of the proposal which may be determined by a machine learning model, a timeframe in which a voting instance is open to voting, or any other information available to the vote processing module 260. Some or all of the information used by the vote processing module 260 in analyzing a voting instance may be generated by the proposal analysis module 270, as described below.

In some embodiments, the user score adjustment module 265 generates and provides instructions to alter a value associated with one or more users of the system 100. For example, when the outcome of implementing a smart contract by the smart contract execution module 250 requires the transfer of a currency amount to a group of users (e.g., as compensation for actions performed by the group of users), the user score adjustment module 265 may generate and/or provide instructions to the financial system 130 to update the amount of currency available to the group of users.

In some embodiments, the proposal analysis module 270 receives information associated with a proposal for adjusting an element of the system 100. As described previously herein, the proposal may be generated by a user. Alternatively, the proposal may be generated by a machine learning model of the governance system 140 based on a determined need to adjust an aspect of the system 100 (e.g., providing compensation to a user, altering a schedule, determining a location for an activity, or any other change that may be proposed). The proposal analysis module 270 may then determine a voting model, timeframe for allowing voting to occur, a starting time for voting, and ending time for voting, a format of a smart contract associated with the proposal, instructions to execute when the proposal is accepted, and/or any other information necessary to implement voting on the proposal and determination of whether the proposal has been accepted.

Example System Interaction

Figure 3:
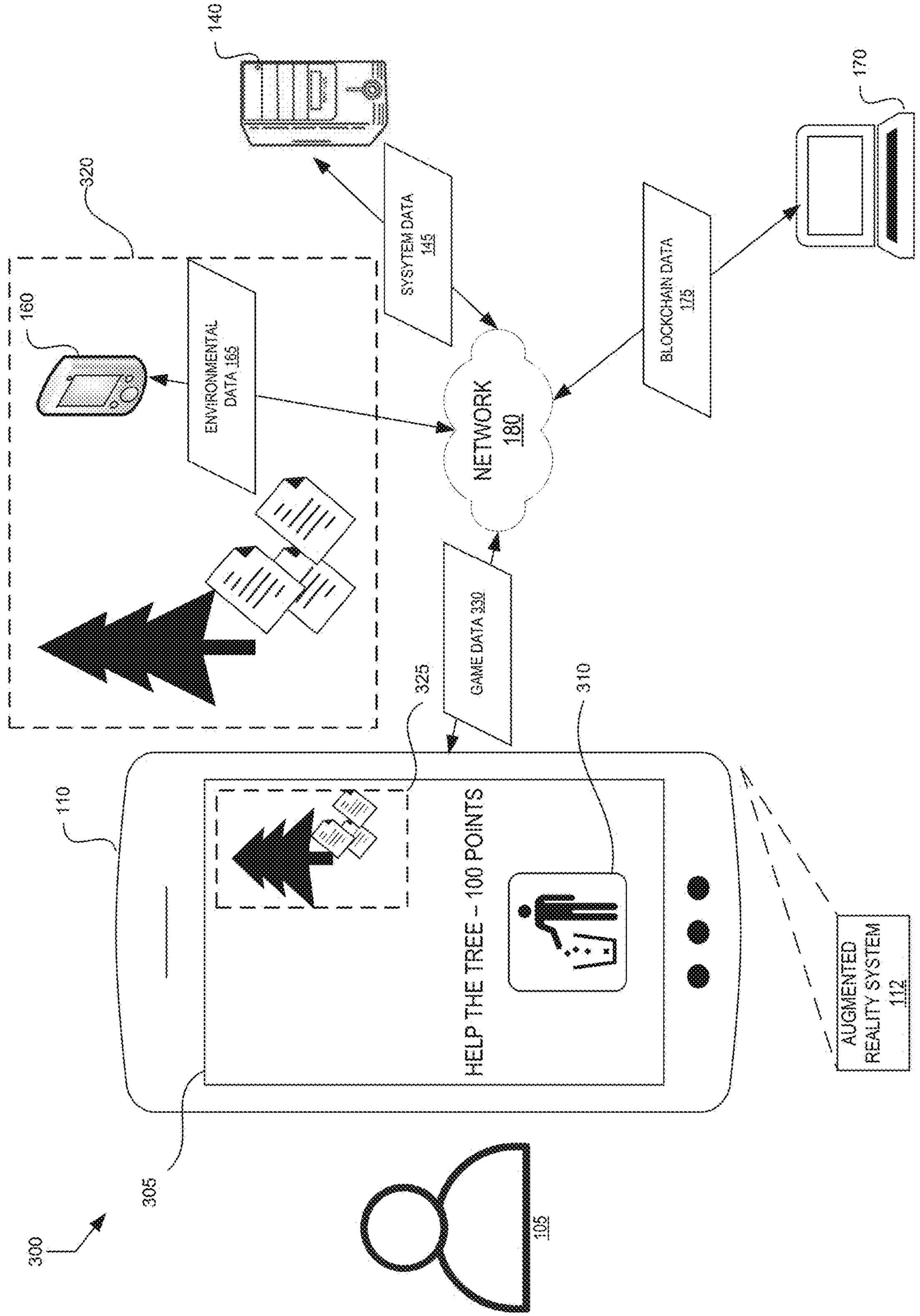
FIG. 3 is a diagram of an illustrative example of an augmented reality activity encouraging a user to engage in a sustainable activity according to some embodiments.

FIG. 3 illustrates an example interaction 300 between the user 105 and the system 100 implementing a scoring system to encourage a sustainable activity. This example interaction 300 comprises interaction between a user 105 and a computing device 110 associated with the user 105, a governance system 140, a blockchain system 170, and an environmental analysis device 160. Some or all of the interactions between these elements of the interaction 300 may be facilitated by a network 180 as described above in reference to FIG. 1.

The environmental analysis device 160 of this example is located in a first area 320. The environmental analysis device 160 is configured to measure a variable and generate environmental data 165 based on the measured environmental variable. In the present example, the environmental analysis device 160 is configured to measure a presence of litter within the first area 320, for example by using a camera in communication with the environmental analysis device 160 and determining, based on the video received from the camera, that objects classified as litter have been observed. The environmental analysis device 160 may then transmit environmental data 165 indicating the presence and location of the detected litter to the governance system 140 via the network 180.

The computing device 110 of this example is configured to present to the associated user 105 a gamified task encouraging the user 105 via a display 305 of the computing device 110. The images presented by the display may be generated by the augmented reality system 112 of the user 105 based in part on game data 330 received from the governance system 140. As part of the display 305, the user is presented with a view 325 representing the first area 320 which may be seen, for example, by a camera of the computing device 110. In some embodiments, the view 325 may be generated entirely by the augmented reality system 112 or another component of the system without input from a camera of the computing device 110, and arranged to present the view 325 as if the computing device 110 was transparent or semi-transparent such that the view 325 reflects the actual first area 320 as seen by the user 105 from their current location. Some or all elements of the gamified task may be generated by, for example, the governance system 140 and received by the computing device 110 as game data 330.

The gamified task presented to the user 105 here is to encourage the user 105 to remove the litter observed by the environmental analysis device 160. The game elements of this example include the view 325, and a message 310 directed to the indicating that the litter is to be placed in a garbage can, that placing the litter in a garbage can helps the tree, and assigning a point value to the action of placing the litter in the garbage can. The point value may, in some embodiments, be a value of a currency associated with the system 100, for example a digital currency recorded on the blockchain system 170 and transmitted between elements of the system 100 as blockchain data 175. The user 105 completing the action, accepting the assignment, or any other interaction with the gamified task may be shared with the system 100 by the computing device 110 as game data 330 recording the actions of the user 105.

The governance system 140, in this example, is configured to receive system data 145 which may comprise environmental data 165, blockchain data 175, and/or game data 330. The governance system 140 may generate, as referenced above, the gamified task. Generating the gamified task is described in further detail in relation to FIG. 4A. The governance system 140 may additionally determine the point, or currency, value assigned to completion of the gamified task, also described in further detail in relation to FIG. 4A.

The blockchain system 170 is one or more computing systems managing one or more blockchain-based systems for currency management, data storage, and other system functions. In this example, the blockchain system 170 may write to one or more blockchains to record, for example, information associated with the gamified task (e.g., a self-executing smart contract providing for an amount of currency to be transferred to a digital wallet associated with the user 105 when the gamified task is completed), environmental data 165 received from the environmental analysis device 160, etc. The changes to the wallet value of the user 105, the creation of a smart contract for the gamified task, or any other information to be recorded to a blockchain may be transmitted between components of the system 100 and the blockchain system 170 as blockchain data 175 via the network 180.

Example System Processes

Figure 4A:
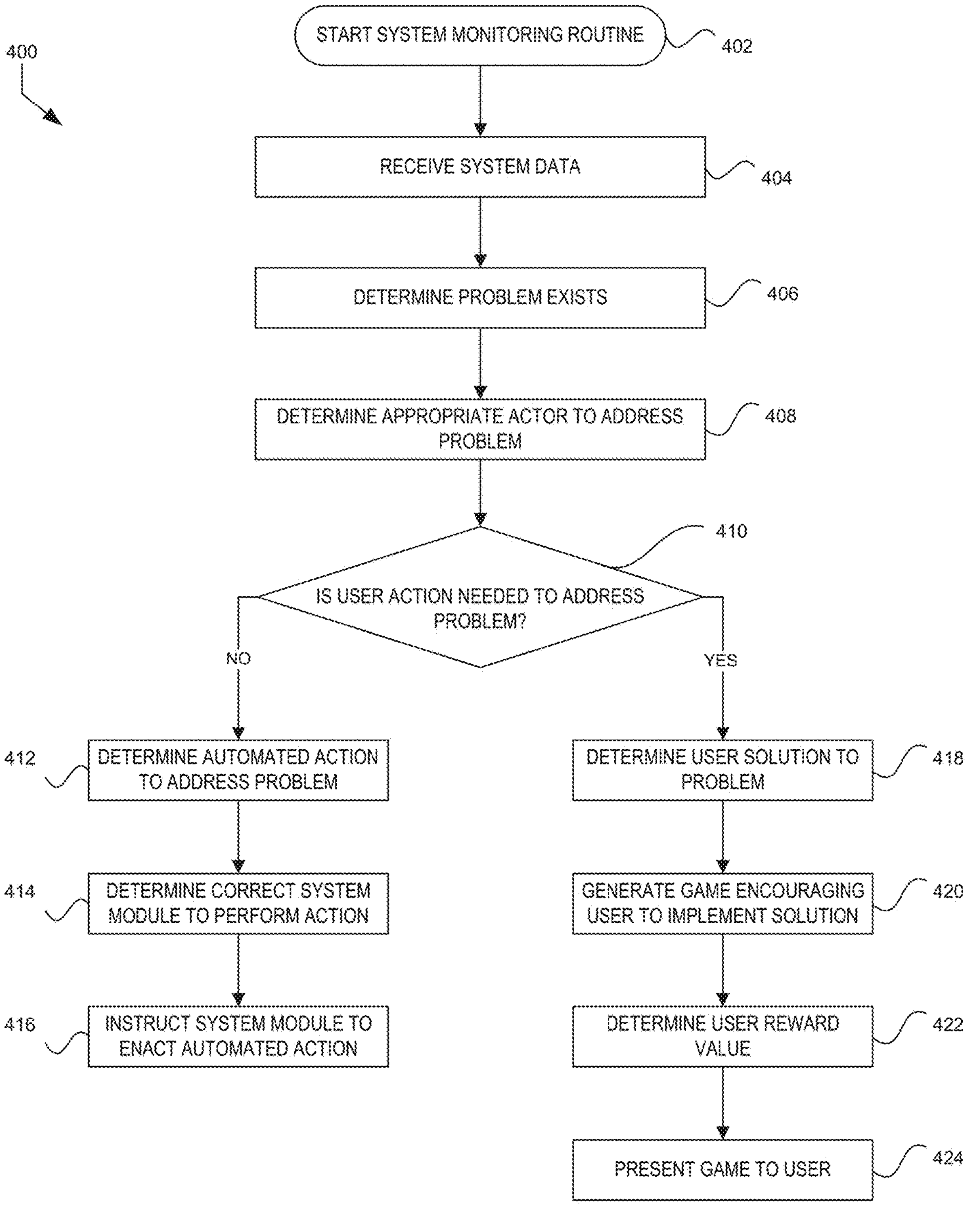
FIG. 4A is a flow diagram of an example routine for determining a response to a system-determined issue according to some embodiments.

FIG. 4A illustrates an example system monitoring routine 400 for analyzing system data 145 to determine when a problem exists in the system 100 and implement a solution. Some or all aspects of the routine 400 may be performed by the governance system 140 and various elements therein. In some implementations, the routine 400 may be performed by one or more elements of the system 100 individually or in combination.

The routine 400 begins at block 402 and may begin in response to, for example, initiation of the governance system 140. The routine 400 then moves to block 404.

At block 404, system data 145 is received by the governance system 140. As discussed previously herein, the governance system 140 may store the received system data 145 in a system data store 245 for further processing. When system data 145 has been received, the routine 400 moves to block 406.

At block 406, the system data 145 is analyzed by the governance system 140 and a problem is determined to exist. For example, the governance system 140 may have received transportation data 155 at block 404 indicating a bus managed by the transportation data 155 has not arrived at an expected location at an expected time. Based on this information, the governance system 140 may then determine a problem exists with the bus, for example by analyzing environmental data 165 comprising video information of the environment and determining the bus has broken down and is stopped due to a deflated tire. When a problem has been determined to exist, the routine 400 moves to block 408.

At block 408, the governance system 140 determines an appropriate actor to correct the problem identified at block 406. Continuing the bus example above, the governance system 140 may analyze transportation data 155 received from the bus and environmental data 165 received from an environmental analysis device 160 to determine that a tire change is needed to correct the deflated tire problem identified at block 406. The governance system 140 may then analyze available system data 145 to determine the resources available to the system 100 to correct the deflated tire of this example. The governance system 140 may determine that an automated tire change may be performed by machinery and/or machine learning models of the system 100. Alternatively, the governance system 140 may determine that no automated system is available to correct the deflated tire, and that a user 105 is required to perform one or more actions to fix or replace the tire. When an appropriate actor has been determined, the routine 400 moves to decision block 410.

At decision block 410, the governance system 140 decides whether a user 105 is needed based on the determination in block 408. If a user action is necessary, the routine 400 moves to block 418. If an automated action is necessary, the routine 400 moves to block 412. In some examples, a user action and an automated action may be needed, and both branches of the routine 400 following decision block 410 may be performed. Further, in such examples, blocks 412-416 and blocks 418-424 may be performed substantially simultaneously, or in different orders. In some examples, multiple user actions and/or automated actions may need to be performed to correct the problem, and the routine 400 may repeat the actions described for implementing a user action or an automated action until all necessary actions to resolve the problem have been performed. Alternatively, each action may be distributed to a different actor such that some or all of the actions may be performed simultaneously. Following the previous tire example, one user may be instructed to bring a new tire to the bus, and another user may be instructed to bring a jack lift to the bus. A third user may then be instructed to lift the bus and change the tire, and the first and second users may be instructed to assist. An automated system may then be instructed to reconfigure the bus schedule of the transportation system 150 to compensate for the delayed bus.

At block 412, the governance system 140 determines an automated action to address and resolve the problem identified at block 406. The automated action may be determined based on analyzing available system data 145 to assess resources available to address the problem. Following the tire example above, the governance system 140 may analyze available resources based on system data 145, and determine that an autonomous vehicle carrying spare tires is available to be deployed to the stopped bus. The governance system 140 may then determine the correct action to address the problem is to instruct the autonomous vehicle to drive to the location of the bus. When an automated action has been determined to address the problem, the routine 400 moves to block 414.

At block 414, the governance system 140 determines the correct system module to perform the automated action. The determination of the correct system module may be based on the system data 145 and the automated action determined at block 412. Continuing the previous example, the governance system 140 may determine that the transportation system 150 is the correct system module to instruct the automated tire delivery vehicle to drive to the bus based on an association in the system data 145 between the transportation system 150 and the automated vehicle indicating the transportation system 150 is in control of the automated vehicle. When the correct system module to perform the action has been determined, the routine 400 moves to block 416.

At block 416, the governance system 140 instructs the system module determined to be correct to perform the automated action at block 414 to perform the automated action. Instructions to perform the action may be natural language instructions, binary instructions, or may be in any other form interpretable by the receiving system module. The instructions may be transmitted by the governance system 140 over the network 180, and in some implementations may be encrypted by the security module 215 to prevent interference with the instructions. In some implementations, the instructions may be transmitted by a secure connection between the governance system 140 and the receiving system module.

At block 418, the governance system 140 determines actions a user 105 may perform to solve the problem identified at block 406. The solution may include, for example, interactions with components of the system 100, interactions with other users, interactions with the environment in which the system 100 operates, etc. When a solution comprising a set of actions has been determined by the system 100, the routine 400 moves to block 420.

At block 420, the governance system 140 generates a game encouraging the user 105 to implement the solution determined at block 418. The game may be designed automatically by the augmented reality management module 230 for the purpose of instructing the user to perform the necessary actions and indicating a reward for completing the actions. An example of such a game is described previously in relation to FIG. 3 above. The routine 400 then moves to block 422.

At block 422, the governance system 140 determines a reward for the user based on completion of actions embedded in the game. In some embodiments, rewards may be provided at various points throughout the performance of the actions of the game, for example various milestones may be included in the game and a reward may be provided to the user for reaching such milestones. The rewards may be determined based on an assessed value to other users and/or the system in solving the problem, a typical reward for solving similar problems, etc. In some cases, such as where one or more users have failed to complete the game or chosen not to participate in the game, the reward may be increased until a user accepts participation in the game and/or completes the actions of the game to solve the problem. When a reward value has been determined, the routine 400 moves to block 424.

At block 424, the governance system 140 presents the game to the user, for example by transmitting game data 330 to the computing device 110 associated with one or more users. In some embodiments, the governance system 140 may select a subset of all available users to present the game to, for example selecting a set of users closest to the site of the problem as determined based on personal data 115 received by the governance system 140 from a computing device 110, selecting a set of users based on previous game performance, selecting a set of users based on a current currency or points value associated with the user by the financial system 130, etc.

Figure 4B:
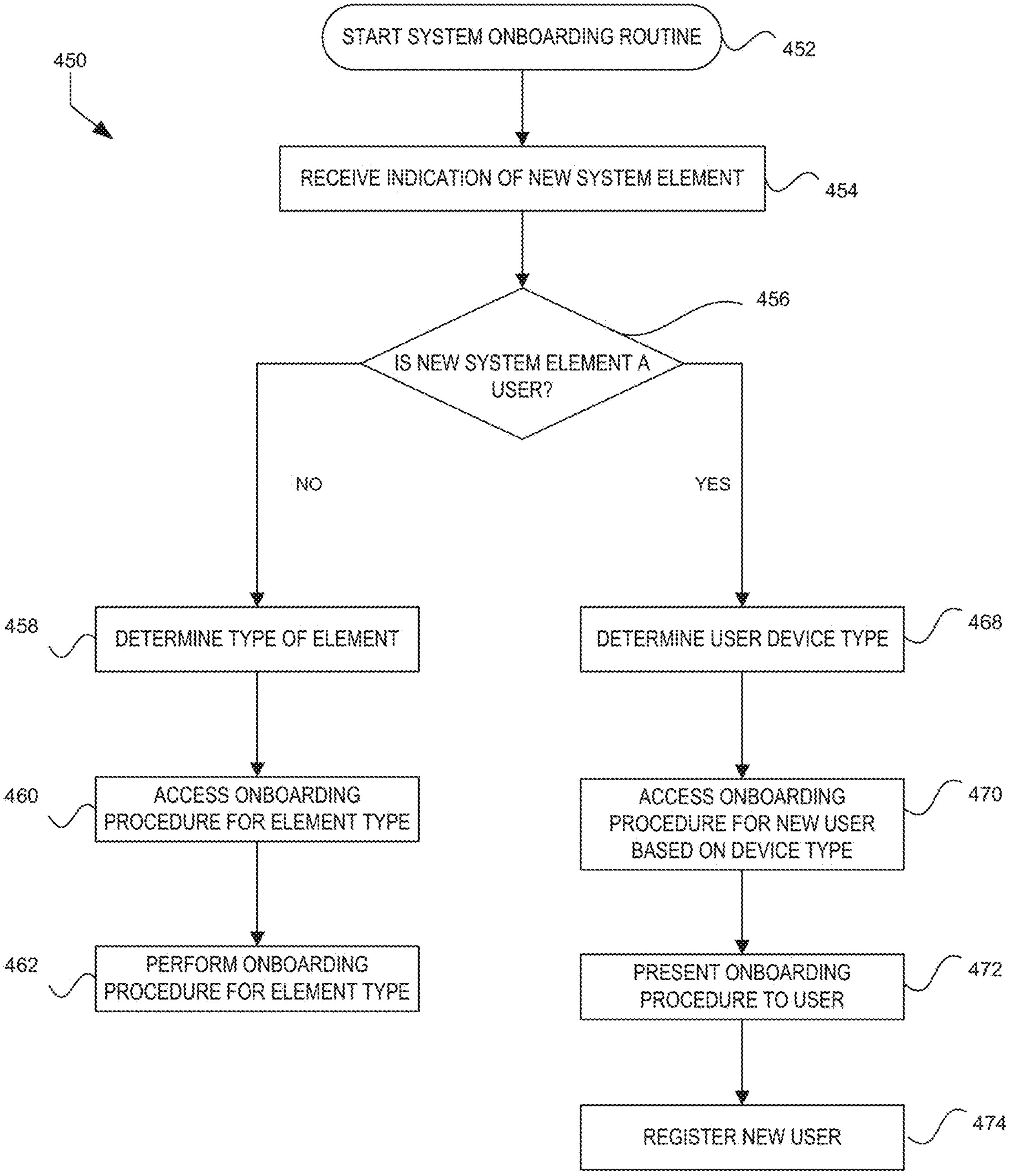
FIG. 4B is a flow diagram of an example routine for adding a new system element according to some embodiments.

FIG. 4B illustrates an example routine 450 for onboarding new system elements. The routine 450 begins at 452 where the governance system 140 monitors for the addition of a new element to the system 100. At block 454 an indication is received that a new system element is connected to the system 100. The indication may be generated automatically in response to a new element interacting with the network 180, for example by transmitting a request over the network 180 to another element of the system 100. When an indication has been received, the routine 450 moves to decision block 456.

At decision block 456, a determination is made as to whether the new system element is a new user. The determination may be made by the governance system 140, for example based on personal data 115 or system data 145 received by the governance system 140 via the network 180. When a new system element is determined to be a new user, the routine 450 moves to block 468. Alternatively, the governance system 140 may determine that the new system element is not a user. When the new element is determined not to be a user, the governance system 140 may determine that further information is needed to determine the type of element being added to the system 100. When the new system element is determined not to be a user, the routine 450 moves to block 458.

At block 458, the type of element of the new system element is determined. The type of element may be determined to be, for example, a new computing device 110, a new environmental analysis device 160, a new blockchain system 170 contributing to the processing of blockchain transactions using one or more chaincodes, a new transportation device (e.g., a car, a bus, etc.) of the transportation system 150, etc. The determination may be made based on system data 145 received by the governance system 140, for example transportation data 155 received from a new bus connecting to the transportation system 150. When the type of element of the new system element has been determined, the routine 450 moves to block 460.

At block 460, the governance system 140 may access an onboarding procedure for the new system element. In some embodiments, the onboarding procedure may be specific to the type of new system element. Alternatively, a common onboarding procedure may be used for all types of new system elements. The onboarding procedure may be stored in a memory associated with the governance system 140, may be transmitted as part of the system data 145 indicating the new system element is present, may be transmitted by an existing system element (e.g., the transportation system 150 may transmit an onboarding procedure for a new system element connecting to the transportation system 150 to the governance system 140), or may be requested by the governance system 140 from another system element when the type of the new system element has been determined at block 458. When the onboarding procedure has been accessed, the routine 450 moves to block 462.

At block 462, the onboarding procedure determined at block 462 is initiated by the governance system 140. The onboarding procedure may comprise registering a device ID, initiating communication with the new system element, recalculating various planning elements to account for the new system element, performing a security check, assigning system permissions, providing initial instructions, or any other action necessary to include the new system element in the system 100. Additionally, the governance system 140 may indicate to a relevant sub-system (e.g., the transportation system 150 of the system 100 when the new system element is a vehicle) that the new system element has completed an onboarding procedure. When the onboarding procedure has completed, the routine ends.

At block 468, when the new system element is determined to be a new user, the governance system 140 or another subsystem of the system 100, may determine the type of computing device 110 the user 105 is using to connect to the system 100. For example, the computing device 110 may be a desktop computer, a smartphone, a laptop computing device, etc. When the type of computing device 110 associated with the user 105 has been determined, the routine 450 may move to block 470 when the type of computing device 110 is relevant to the onboarding procedure used to register a new user. Alternatively, where a general onboarding procedure exists, the routine 450 may skip block 470 and move directly to block 472.

At block 470, the governance system 140 accesses an onboarding procedure based on the determination of the computing device 110 at block 468. For example, a request for further personal data 115 may be required to be presented to the user 105 as part of the onboarding procedure. Where the computing device 110 is a smartphone, the onboarding procedure may be presented in a different manner than if the computing device 110 was a desktop computing device. Further, different personal data 115 may be available from different device types. For example, a smartphone may be in communication with a camera and so a picture of the user 105 may be taken as part of the onboarding procedure. Whereas if the computing device 110 is a desktop computing device, it cannot be assumed that the computing device 110 is in communication with a camera, and a request for an existing picture of the user 105 may be requested instead. When the onboarding procedure has been accessed based on device type, the routine 450 moves to block 472.

At block 472, the onboarding procedure is presented to the user 105. For example, instructions may be transmitted from the governance system 140 to the computing device 110 associated with the new user 105 to display instructions to the user 105 to input information necessary to complete registration with the system 100. The information may be input via a keyboard, touchscreen, microphone, or any other input device in communication with the computing device 110 or the network 180. When the onboarding procedure has been presented to the user 105, the routine 450 moves to block 474.

At block 474, the onboarding procedure is completed, and the new user 105 is registered with the system. Registration may include assigning a unique identifier to the user 105, assigning a digital wallet for blockchain currencies to the user 105, assigning privileges allowing the user 105 to access parts of the system 100 for which permission is needed, and assigning any other data or access to the user 105 determined to be needed based on the outcome of the onboarding procedure.

Figure 5:
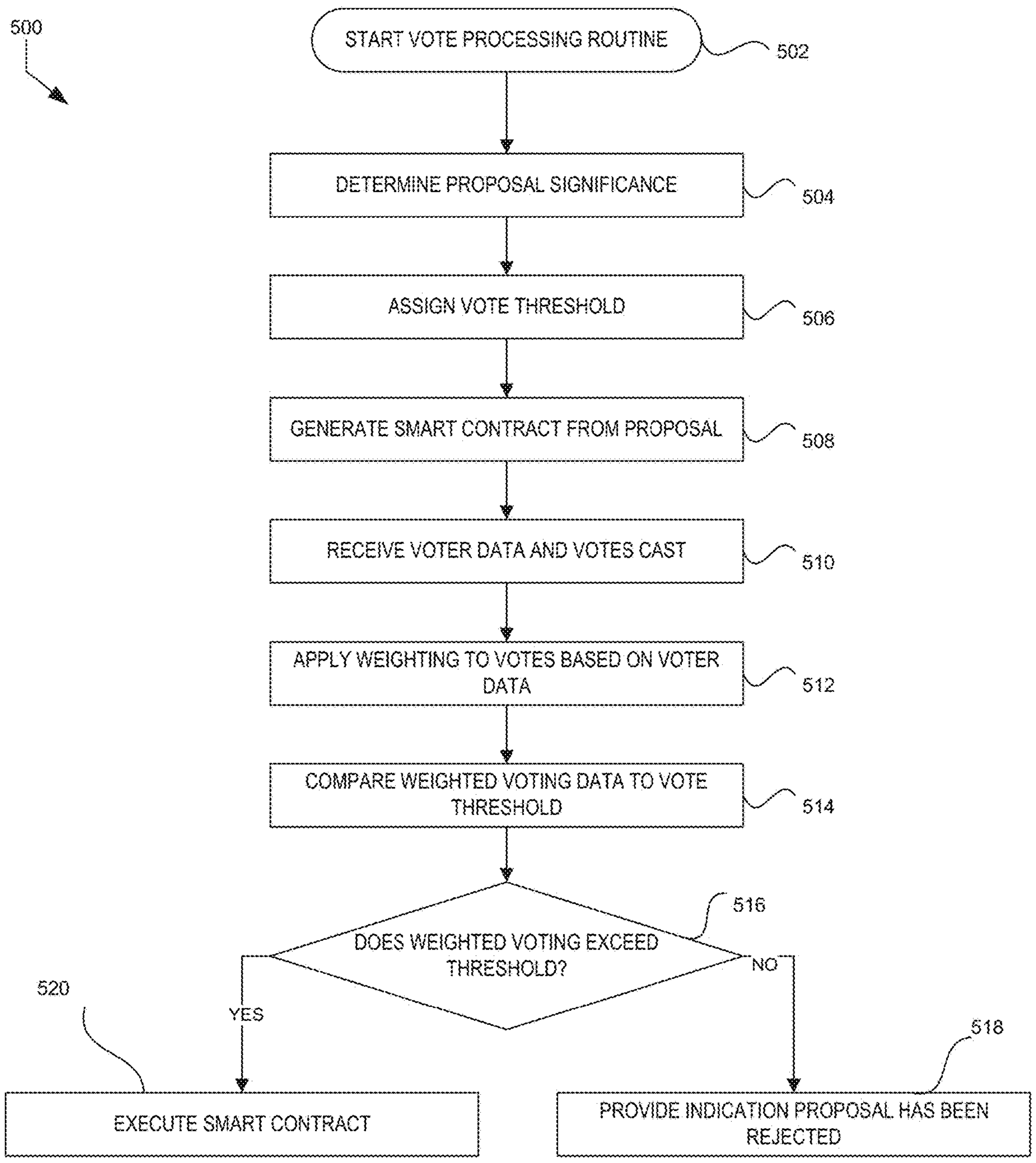
FIG. 5 is a flow diagram of an example routing for responding to a proposal requiring a vote according to some embodiments.

FIG. 5 illustrates an example routine 500 for conducting a vote via the system 100. The routine 500 may begin at block 502 in response to the governance system 140 receiving a proposal, or at a time determined by a subsystem of the system 100 based on a need to make a decision requiring user input. When a vote on a proposal is initiated, the routine 500 moves to block 504.

At block 504, the governance system 140 determines the significance of the proposal. For example, a proposal to add a new environmental analysis device 160 to the system 100 may be determined to be a less significant change to the operation of the system 100 than a proposal to reduce the currency available to the financial system 130. When a significance of the proposal has been determined, the routine 500 moves to block 506.

At block 506, a vote threshold for accepting the proposal is determined. The vote threshold may be determined based on the significance of the proposal as determined at block 504. For example, a proposal determined to have a significant impact on the system 100 may require a supermajority (e.g., ⅔ of total voters) approval to be accepted, whereas a proposal determined not to have a significant impact on the system 100 may require a simple majority for approval. When a voting threshold has been determined, the routine 500 moves to block 508.

At block 508, a smart contract is generated from the proposal. The smart contract may be a self-executing code written to a block chain or chaincode of the blockchain data 175 that, when a voting threshold determined at block 506 is reached, automatically executes. The automatic execution of the self-executing code designed to implement the proposal. When the smart contract has been generated and stored on a blockchain or chaincode, the routine 500 moves to block 510.

At block 510, the governance system 140 receives voter data, for example from the voting information data store 235, and the votes cast by each voting user 105. The governance system 140 may continue to receive votes for a set amount of time, the time may be determined based on the significance of the proposal determined at block 504. Alternatively, a vote may remain open until a threshold number of votes, for example all eligible voters, have been received. When the voting is complete, the routine 500 moves to block 512.

At block 512, a weighting may be applied to the vote totals. For example, users may have a weight proportional to their score applied to their votes. Voting weights may be determined based on information stored, for example, in the voting information data store 235, or the marketplace system 120. When the weighting has been applied to each vote the routine 500 moves to block 514.

At block 514, the weighted voting data determined at block 512 is compared to the threshold defined in the smart contract. Alternatively, the weighted voting data may be continuously compared to the threshold in the smart contract such that when the threshold is reached voting is automatically closed and a result is determined. When the weighted voting data has been compared to the threshold, the routine 500 moves to decision block 516.

At decision block 516, a determination is made as to whether the threshold defined in the smart contract has been reached. If voting has closed, and the threshold has not been reached, then the smart contract will not execute and the routine 500 moves to block 518 where an indication of the rejection of the proposal is transmitted to the users, for example as a notification on a computing device 110. If the threshold has been reached, then the routine 500 moves to block 520, and the smart contract self-executes, thereby implementing the proposal automatically.

Figure 6:
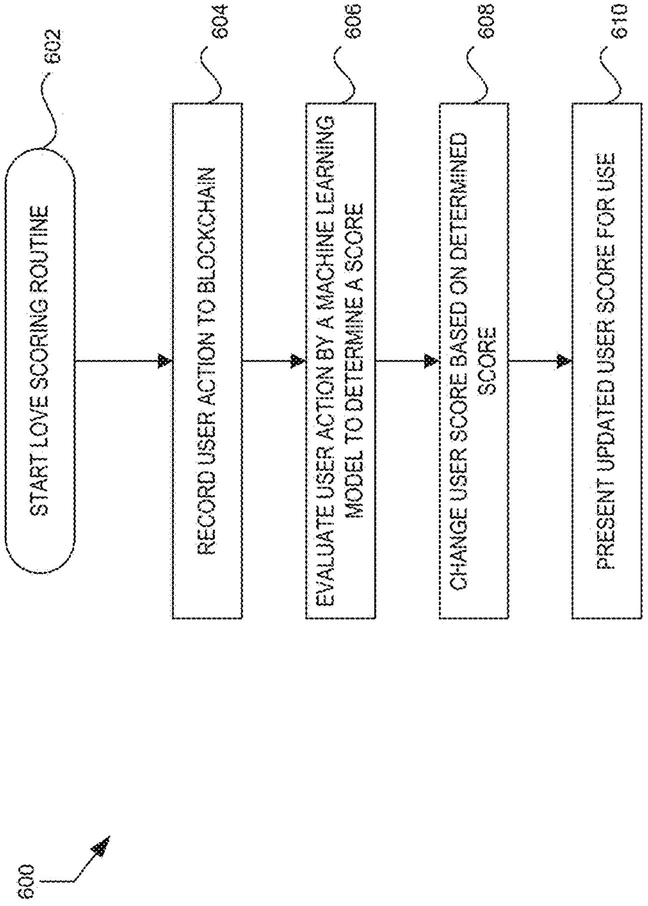
FIG. 6 is a flow diagram of an example routine for a Love scoring system according to some embodiments.

FIG. 6 illustrates an example routine 600 implementing a Love Scoring system. The routine 600 beings at block 602, and may begin in response to the governance system 140, financial system 130, or another system maintaining a Love score, receiving an indication of a user action affecting a user 105 Love score. When such an indication is received, the routine 600 moves to block 604.

At block 604, the user's action is recorded to the blockchain maintaining the Love scoring system, for example a blockchain maintained by the blockchain system 170. Recording the user action to the blockchain maintains the transparency and fairness of the system, thereby allowing for outside review of user actions and added assurance that Love score adjustments are made equitably. When the user's action has been recorded to the blockchain, the routine 600 moves to block 606.

At block 606, the user action recorded to the blockchain at block 604 is evaluated, for example by the governance system 140 or the blockchain system 170 using a machine learning model configured to determine an action's value in the Love scoring system. The machine learning model may be stored, for example, in the machine learning model data store 240, and may be run on the governance system 140 or transmitted via the network 180 to a device for determining an updated Love score. A Love score determined by the machine learning model may be a positive or negative value, and the magnitude of the value may be determined based on an evaluation of the overall effect on the system 100 of the user action. When the user score has been determined, the routine 600 moves to block 608.

At block 608, the Love score associated with the user 105 of this example is updated. For example, a value may be added or removed from a digital wallet containing score currency associated with the user 105. The value may be the score determined at block 606. Alternatively, the value may be an adjustment value determined based on the score determined at block 606, for example the adjustment value may be weighted based on the user's experience or time spent registered with the computing device 700. The user Love score may be stored by the blockchain system 170, and may be updated by blockchain data 175 transmitted from the governance system 140 to the blockchain system 170 via the network 180. When the Love score associated with the user 105 has been updated, the routine 600 moves to block 610.

At block 610, the updated Love score is presented to the user, for example by the computing device 110 associated with the user. Alternatively, the user 105 may use an application to access the digital wallet containing a digital currency value indicating the user's current Love score.

Execution Environment

Figure 7:
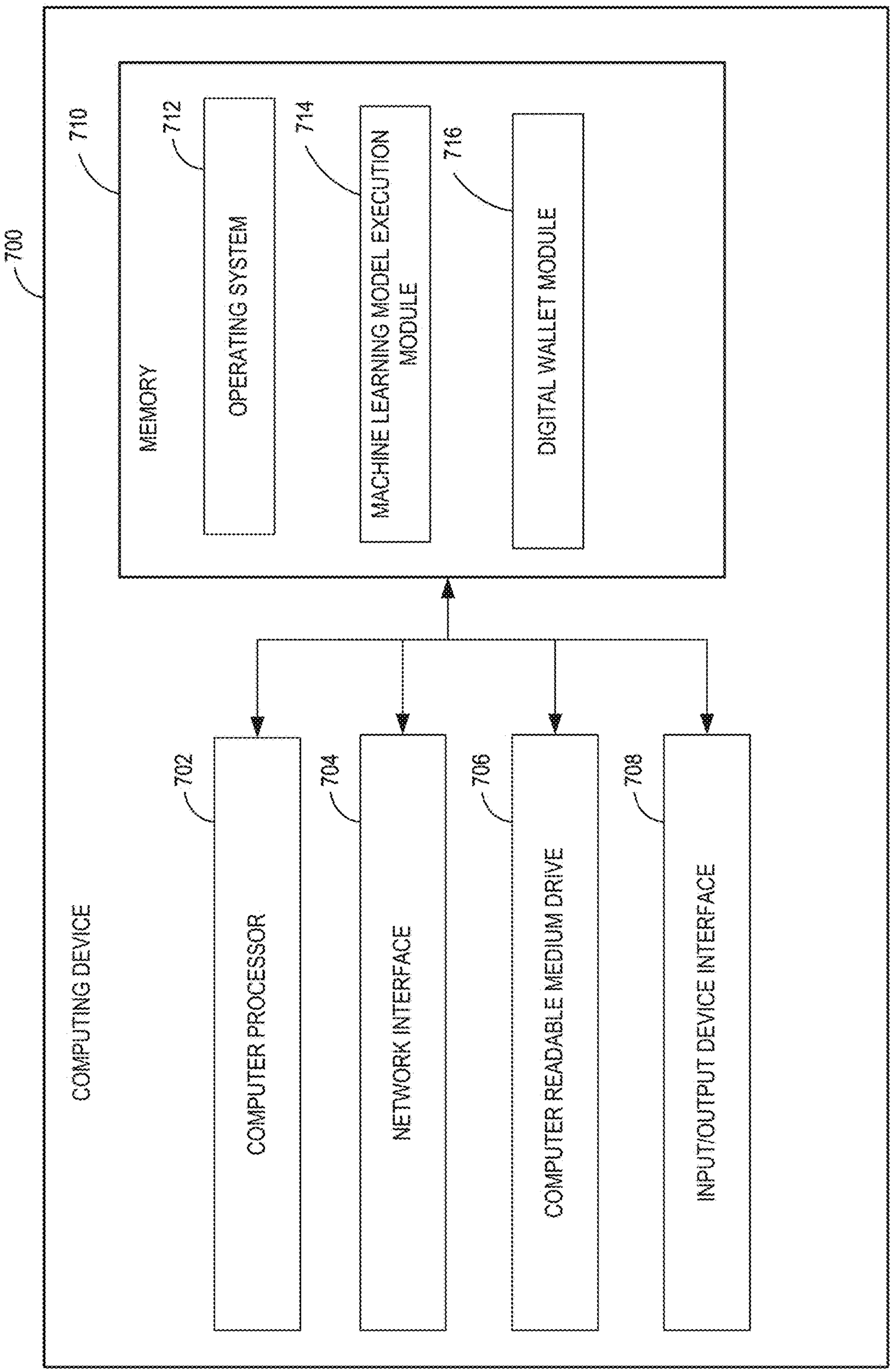
FIG. 7 is a block diagram of an illustrative computing system configured to be incorporated in a sustainable system according to some embodiments.

FIG. 7 illustrates various components of an example computing device 700 configured to implement various functionality described herein.

In some embodiments, the computing device 700 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by any component of the computing device 700 may be implemented as web services consumable via one or more communication networks. In further embodiments, a component of the computing device 700 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a computing device 700 may include: one or more computer processors 702, such as physical central processing units ("CPUs"); one or more network interfaces 704, such as a network interface cards ("NICs"); one or more computer readable medium drives 706, such as a high density disk ("HDDs"), solid state drives ("SSDs"), flash drives, and/or other persistent non-transitory computer readable media; one or more input/output device interfaces; and one or more computer-readable memories 710, such as random access memory ("RAM") and/or other volatile non-transitory computer readable media.

The computer-readable memory 710 may include computer program instructions that one or more computer processors 702 execute and/or data that the one or more computer processors 702 use in order to implement one or more embodiments. For example, the computer-readable memory 710 can store an operating system 712 to provide general administration of the computing device 700. As another example, the computer readable memory 710 can store a machine learning model execution module 714 for implementing machine learning models stored or received by the computing device 700. As another example, the computer-readable memory 710 can store a digital wallet module 716 for interacting with blockchain data 175 to update, store, and present a current currency or score value belonging to the user associated with the computing device 700.

Model Storage and Retrieval Routine

Figure 8:
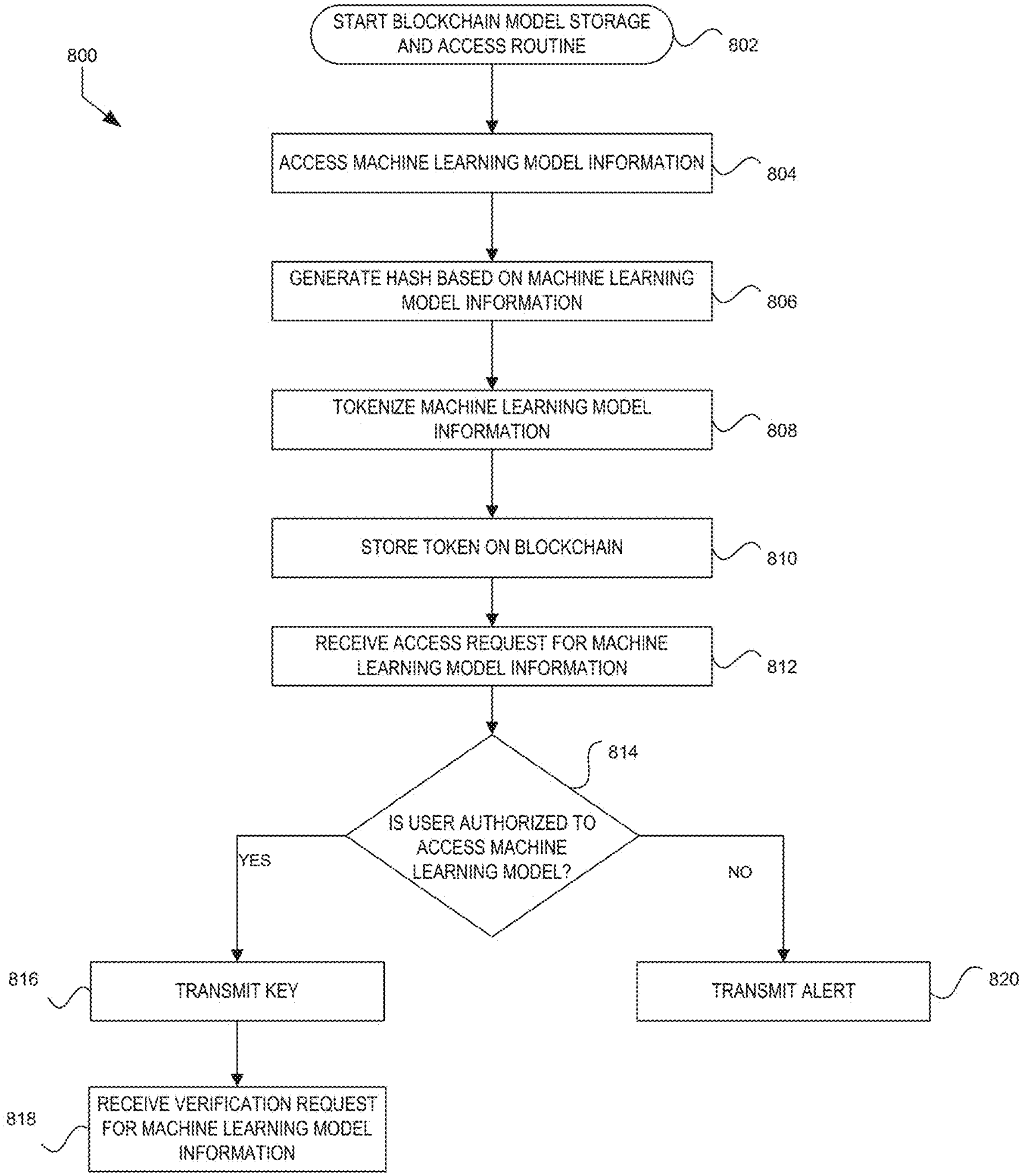
FIG. 8 is a flow diagram of an example routine for storing machine learning model information on a blockchain and allowing secure access to the machine learning model.

FIG. 8 illustrates example routine 800 for storing machine learning model information on a blockchain and allowing secure access to the machine learning model. The routine 800 begins at block 802, for example in response to the blockchain system 170 or governance system 140 receiving a request to store machine learning information on a blockchain for access by a model user. The routine 800 may allow a model information provider to store information related to a machine learning model using a blockchain system 170. A model information provider may be a user 105 that has modified, created, or altered a machine learning model, for example by training a machine learning model using training information. The machine learning model information may include, for example, training information used to train or modify a machine learning model, source code for a machine learning model, one or more weight values for nodes or links in a machine learning model (e.g., nodes representing neurons in a neural network, connections between neurons in a neural network, bias values for an LLM, and the like), a set of parameters for a machine learning model, or a machine learning model package including all information to use the machine learning model, a smart contract allowing access to a machine learning model, a uniform resource locator (URL) or other location indicator for a model user to stored machine learning model information, and the like.

The routine 800 further allows a second user 105, referred to in this example routine 800 as a model user, to access the machine learning model information stored on the blockchain by the model information provider. To ensure the security and integrity of the machine learning model information on the blockchain, the blockchain system 170, governance system 140, or another computing device 700 of the system 100 may validate the model user's request for access to the machine learning model. For example, the machine learning model information may be stored on the blockchain as a smart contract, where the model user's fulfilment of an attribute (e.g., a requirement, a term, and the like) of the smart contract automatically results in the machine learning model information being provided to the model user. In this way, security of the machine learning model information may be maintained by requiring fulfillment of a smart contract before the model user is given access to the machine learning model information, or a decryption key for encrypted machine learning model information. The unencrypted machine learning model information, or an encryption key usable to decrypt encrypted machine learning model information, may be stored on the governance system 140 or another system of the system 100 (e.g., in the machine learning model data store 240 or the system data store 245). Smart contract integration may be provided by the governance system 140 through the blockchain interaction module 205.

As will be described in further detail below, the machine learning model information may be stored on the blockchain in the form of a hash, or a compressed form. Advantageously, while the entirety of the machine learning model information may exceed a storage capacity of a blockchain, or otherwise be impractical for storage on the blockchain, a hashed or compressed form of the machine learning model information may allow the machine learning model information to be represented on the blockchain. Representing at least a portion of the machine learning model on the blockchain, for example in the form of a hash generated from the machine learning model information, may make enable efficient, secure storage of the machine learning model information. Additionally, storing a hash of the machine learning model information on the blockchain may allow users to verify the integrity of a copy of the machine learning model information by comparing a hash stored on the blockchain to a hash generated from the copy of the machine learning model. When the hash values match, the user can be confident their copy of the machine learning model information is the same machine learning model information provided by the model information provider, as the hash stored on the blockchain is traceable and immutable.

At block 804, the governance system 140 accesses the machine learning model information. The machine learning model information may be accessed based in part on the request. For example, the request may indicate a storage location where the machine learning model information is stored. The request may further indicate a portion of the machine learning model information to be stored. In some embodiments, the request may include at least a portion of the machine learning model information. In additional embodiments, the machine learning model information may be stored in a repository capable of generating alerts when a change to the machine learning model information. For example, at least a portion of the machine learning model information may be stored in a git repository, and when a commit is made to the repository the governance system 140 may receive an alert. The governance system 140 may then access the repository to retrieve the machine learning model information in response to the alert. In such embodiments, the storage of updated machine learning model information may be automated, and the model information provider may not transmit the request to store the machine learning model information after initially requesting the storage of the machine learning model information and providing information for the repository to the governance system 140.

At block 806, the governance system 140 generates a hash based on at least a portion of the machine learning model information. For example, the hash may be based on the entire information for a machine learning model, weight value information, bias value information, training information used to train a machine learning model, a machine learning model identifier, or other information that may be associated with the machine learning model (e.g., information useful for identifying the machine learning model represented by the hash). The hash may be generated by applying the machine learning model information to be hashed as input to a hashing function. For example, the hashing function may be at least one of MD5, SHA-1, SHA-256, and the like. The hashing function may use a secret value (e.g., a salt value) to limit the ability of a third party to recreate the hash value. In this way, the governance system 140 may act as a trusted authority for the integrity of machine learning model information stored, or accessed based on information stored, on the blockchain. Alternatively, the hashing function may be a publicly accessible hashing function. In such alternatives, a model user may generate a user hash for the same machine learning model information used to generate the hash by the governance system 140. The model user may then compare the two hash values, and if they are the same the model user can have an increased confidence that the machine learning model information provided to the model user has not been tampered with.

In some embodiments, the governance system 140 may generate a plurality of hashes for the machine learning model information. The plurality of hashes may be structured as a hash tree (e.g., a Merkle tree) where relationships between the hash values are maintained as connections in the hash tree. The hash tree may have a hash tree root node. In an example, the hash tree may be a binary tree, where each node except the leaf nodes (e.g., the lowest level node), is connected to at most two child nodes and at most one parent node. The governance system 140 may generate a hash value for each of the leaf nodes based on a portion of the machine learning model information associated with the respective leaf node. The governance system 140 may then advance a level up the hash tree, and generate a hash value for each node based on the two or fewer child nodes associated with each node at this level. The governance system 140 may continue to advance level-by-level up the hash tree, where the hash value for nodes at each of these intermediate levels is determined based on the hash value of the directly connected child nodes associated with each node. When has values for the nodes of the intermediate levels of the tree have been generated up to the root node, the governance system 140 may generate a hash value for the root node. The root node hash is generated based on the hash values of the two or fewer directly-connected child nodes of the root node. By generating the hash values in this layer-by-layer manner, the hash value of the root node may represent information for the entirety of the machine learning model information that has been hashed.

At block 808, the governance system 140 tokenizes at least a portion of the machine learning model information. The machine learning model information that is tokenized may be the same machine learning model information for which the hash was generated. Tokenization of the machine learning model information may be performed to comply with a standard for generating non-fungible tokens (NFTs) to be stored on a blockchain (e.g., ERC-721, ERC-1155, ERC-998, BEP-721, BEP-1155, SIP-009, and the like). In some embodiments, the governance system 140 may associate the generated token with a smart contract. The smart contract may be software code that enforces one or more requirements of a machine learning model provider to allow use of the machine learning model information. Examples of requirements include payment of a fee, acceptance of a licensing agreement, or acceptance of any other term of use related to use of the machine learning model. Further, the tokenized machine learning model information may be appended to the hash value generated at block 806. Advantageously, appending the token to the hash value may allow for more efficient determination by a model user of whether the machine learning model information received by the model user is the expected machine learning model when the token and hash are stored on the blockchain. Further, prior to, or during, tokenization of the machine learning model information, the governance system 140 may encrypt the machine learning model information. The governance system 140 may obfuscate at least a portion of the machine learning model information, for example by replacing some machine learning model information with a value associated with the machine learning model information in a lookup table maintained by the governance system 140. This may prevent a user of the blockchain from recovering the machine learning model information from the token unless the governance system 140 provides additional information (e.g., a cryptographic key, the lookup table, and the like). This advantageously allows for protection of the machine learning model information even when the information becomes available on a public ledger associated with a blockchain.

At block 810, the governance system 140 stores the token representing at least a portion of the machine learning model on the blockchain. To store the token on the blockchain, the governance system 140 may transmit the token to a blockchain system 170. Storing the token on the blockchain may add the token information to a public ledger represented by the blockchain. Further, storing the token on the blockchain may make the token information publicly accessible. As discussed previously herein, the token may be appended to the hash representing at least a portion of the machine learning model information. The token and the hash may then be stored on the blockchain. Advantageously, the posting of the hash to the public ledger of the blockchain allows a user to verify the integrity of machine learning model information associated with the hash (e.g., used to generate the hash value). The token may further be associated with a smart contract, and the smart contract may be stored on the blockchain in a manner that the token is not readable by a model user without execution of the smart contract. For example, the token may include an encrypted or obfuscated version of at least a portion of the machine learning model information. Execution of the smart contract may be associated with allowing a model user to decrypt or otherwise access the machine learning model information.

Further, the governance system 140 may generate a public listing for the machine learning model information associated with the information stored on the blockchain. The public listing may include requirements or terms of use for the machine learning model, a price for the machine learning model information, a capability of the machine learning model, information associated with the training information used to train the machine learning model (e.g., sources of the training information, copyright information for the training information, and the like). The public listing may be generated by the governance system 140 for display in a graphical user interface as part of an online marketplace (e.g., the marketplace provided by the marketplace system 120).

At block 812, the governance system 140 receives an access request for the machine learning model information. The access request may be received from a computing device 110 associated with a user 105 that has downloaded the machine learning model information from the blockchain, or a location indicated by the token associated with the machine learning model on the blockchain. In some embodiments, the access request may be automatically generated when a smart contract associated with the machine learning model information is executed (e.g., when a requirement of the smart contract is satisfied by a user). Accessing the machine learning model information may allow the model user to use the model, for example on the computing device 110 or on another computing device (e.g., a third-party computing device provided as part of a cloud computing service). The access request may include user information that indicates an identity of the user requesting access to the machine learning model information. Alternatively, the user information may indicate authorization for any user transmitting the user information to access the machine learning model information (e.g., the user information may be automatically generated by the execution of the smart contract). In additional embodiments, access to the machine learning model information may have been provided through an online marketplace, and the user information may be an indication that the user has purchased or acquired access to the machine learning model through the online marketplace. In some embodiments, the access request may be received from a graphical user interface provided by the online marketplace, or may be received automatically from the online marketplace system (e.g., the marketplace system 120) in response to a purchase event.

At decision block 814, the governance system 140 determines whether a user 105 is authorized to access machine learning model information. To determine whether the user is an authorized user, the governance system 140 may determine whether user information matches expected user information. Where the user information matches expected user information, the governance system 140 may determine that the user 105 is authorized to access the machine learning model information. The routine 800 may then proceed to block 816 to allow the user to access the machine learning model information. Where the user information does not match the expected user information, the routine 800 may proceed to block 820.

At block 816, the governance system 140 transmits a key to the user 105 based on the user having been determined at decision block 814 to be authorized to access the machine learning model information. The key may be any information that allows the user 105 to decrypt, or reverse an obfuscation of, the machine learning model information provided to the user 105. The user 105 may have accessed the machine learning model information directly from the blockchain. Alternatively, the token or smart contract stored on the blockchain may have allowed the user to retrieve the machine learning model information from a storage location (e.g., a hard drive, solid state drive, or other storage medium of the machine learning model data store 240). In additional embodiments, the user may have received the machine learning model information from an online marketplace.

At block 818, the governance system 140 receives a request to verify the machine learning model information from a user 105. In some embodiments, the model user (e.g., user 105) may transmit at least a portion of the machine learning model information to the governance system 140 with the request to verify. The governance system 140 may then generate a hash value based on the received machine learning model information, and compare the generated hash value to a stored hash value (e.g., the hash value stored on the blockchain) associated with the machine learning model information. The governance system 140 may then transmit a verification result to the model user indicating whether the verification of the machine learning model information was successful (e.g., the generated hash value matched the stored hash value). Alternatively, the governance system 140 may transmit a salt value, an information portion indicator indicating the portion of the machine learning model information that should be hashed to verify the information, or other information that the model user can use to generate a hash value for at least a portion of the machine learning model information (e.g., using the computing device 110). The model user may then compare the hash value they have generated to the hash value stored on the blockchain to verify the integrity of the machine learning model information. Advantageously, this allows the model user to verify that the machine learning model information they have received is the same machine learning model information that the model user expected to receive. This may reduce the risk of tampering or other errors from affecting the model user. For example, the governance system 140 may receive an update notice from a repository where the machine learning model information is stored, or may generate an update notice when the machine learning model information is stored by the governance system 140. The governance system 140 may also transmit the update notice to the model user to inform the model user of a change to the machine learning model information. Additionally, when a machine learning model is updated, the model information provider may generate a new hash for the machine learning model information. As each of the hashes generated for the machine learning model information is stored on the blockchain, and is immutable, model users that may have access to different versions of the machine learning model information may verify any version of the machine learning model information against the hash stored on the blockchain.

At block 820, when the governance system 140 has determined that the user is not an authorized user of the machine learning model information, the governance system 140 may transmit an alert. The alert may be transmitted to a marketplace (e.g., the marketplace system 120) where the machine learning model information is available for purchase or access. Further, the alert may be transmitted to the model user that requested access to the machine learning model information to inform the user that they do not have access to the machine learning model information.

When a routine described herein (e.g., routine 400, 450, 500, 600, or 800) is initiated, a set of executable program instructions stored on one or more non-transitory computer-readable media (e.g., hard drive, flash memory, removable media, etc.) may be loaded into memory (e.g., random access memory or RAM) of a computing device, such as the memory of the computing device 700 shown in FIG. 7, and executed by one or more processors. In some embodiments, the routines 400, 450, 500, 600, and 800, or portions thereof, may be implemented on multiple processors, serially or in parallel.

It should be understood that while the routines 400, 450, 500, 600, and 800 are presented as having a set of blocks in a fixed order above herein, and in FIGS. 4A-6 and 8, the operations described by the blocks may occur in a different order. Further, some blocks of the routines 400, 450, 500, 600, and 800 may be optional, and when the computing device 700 performs the routine 400, 450, 500, 600, or 800 these optional blocks may be omitted. Additionally, portions of the routines 400, 450, 500, 600, or 800 may be combined to enable additional functionality.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method, comprising:
- receiving a request to generate a model token;
- accessing a machine learning model;
- generating a hash based on the machine learning model;
- generating a token based on the machine learning model, wherein the token comprises the hash;
- storing the token on a blockchain storage system;
- receiving a verification request for the machine learning model comprising a user hash;
- determining whether the user hash matches the hash; and
- based on determining the user hash is a same as the hash, transmitting an indication that integrity of the machine learning model is verified.

2. The computer-implemented method of claim 1 further comprising receiving a first smart contract attribute, and wherein generating the token comprises:
- generating a smart contract based on the first smart contract attribute;
- tokenizing the smart contract and the machine learning model to generate a model use token; and
- appending the hash to the model use token, wherein the token is the model use token.

3. The computer-implemented method of claim 2, wherein the verification request comprises a notification indicating the first smart contract attribute is satisfied, and wherein determining the user hash matches the hash occurs automatically in response to the notification.

4. The computer-implemented method of claim 1, wherein generating the hash based on the machine learning model comprises:
- accessing a model weight associated with the machine learning model; and
- hashing the model weight.

5. The computer-implemented method of claim 4, wherein hashing the model weight comprises applying the model weight as input to a hash function.

6. The computer-implemented method of claim 5, wherein the hash function is one of: MD5, SHA-1, or SHA-256.

7. The computer-implemented method of claim 1, wherein generating the hash based on the machine learning model comprises applying source code of the machine learning model as input to a hash function.

8. The computer-implemented method of claim 7 further comprising:
- transmitting a source code request to a machine learning model storage location; and
- receiving the source code of the machine learning model from the machine learning model storage location.

9. The computer-implemented method of claim 1 further comprising:
- generating a public listing for the machine learning model; and
- transmitting user interface information comprising the public listing for display in a graphical user interface, and
- wherein the verification request is received via the graphical user interface.

10. The computer-implemented method of claim 1, wherein generating the token comprises:
- accessing a model weight associated with the machine learning model; and
- tokenizing the model weight.

11. The computer-implemented method of claim 1, wherein generating the token comprises:
- accessing source code of the machine learning model; and
- tokenizing at least a portion of the source code.

12. The computer-implemented method of claim 1, wherein the token is generated according to a tokenization standard, and wherein the tokenization standard is selected based in part on the blockchain storage system.

13. The computer-implemented method of claim 12, wherein the blockchain storage system is Ethereum, and wherein the tokenization standard is one of: ERC-721, or ERC-1155.

14. The computer-implemented method of claim 1, wherein the blockchain storage system is selected from among a plurality of blockchain storage systems based on the request to generate the model token.

15. The computer-implemented method of claim 1, wherein the hash is generated using a hashing function, and wherein the hashing function is selected based in part on the blockchain storage system.

16. The computer-implemented method of claim 1 further comprising:

transmitting user interface information to a user computing system to cause the user computing system to display a graphical user interface, wherein the request is received via the graphical user interface.

17. The computer-implemented method of claim 1 further comprising:

receiving an access request for the machine learning model; and in response to receiving the access request, transmitting the hash to a user computing system.

18. The computer-implemented method of claim 17 further comprising:

receiving a second user request for the machine learning model comprising a second user hash;

determining the second user hash does not match the hash; and based on determining the user hash does not match the hash, transmitting an alert to the user computing system indicating the integrity of the machine learning model is not verified.

19. The computer-implemented method of claim 1 further comprising:

receiving an update notice associated with the machine learning model indicating a change to at least one weight value associated with the machine learning model;

generating an updated hash for the machine learning model based in part on the changed at least one weight value;

generating an updated token comprising the updated hash; and storing the updated token on the blockchain storage system.

20. The computer-implemented method of claim 19 further comprising transmitting an update notice to a user of the machine learning model indicating the change to the at least one weight value.

* * * * *